Figures 8, 9:
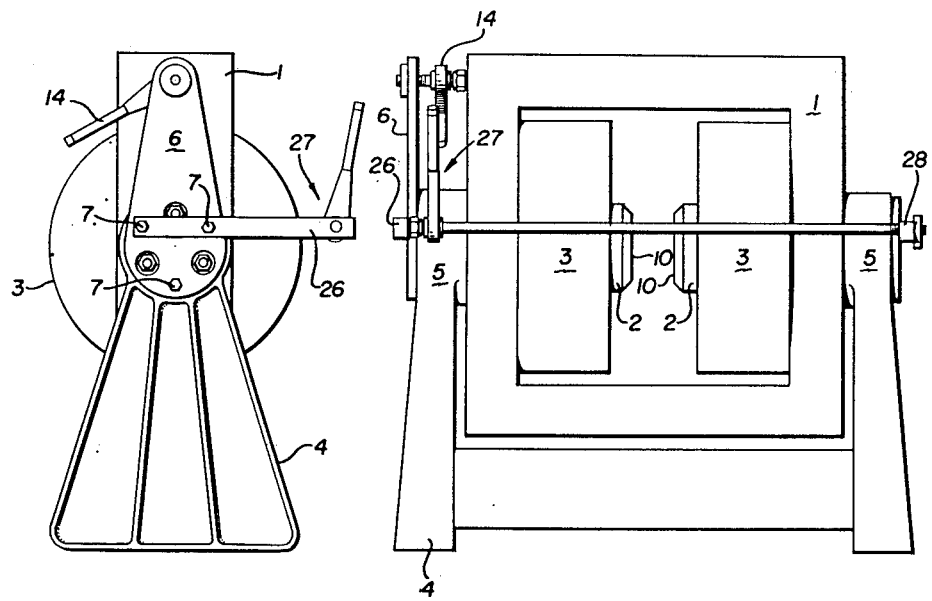

Sept. 25, 1962
F. A. NELSON
3,056,070
MAGNET ADJUSTING METHOD AND APPARATUS
Filed Sept. 27, 1957
3 Sheets-Sheet 1
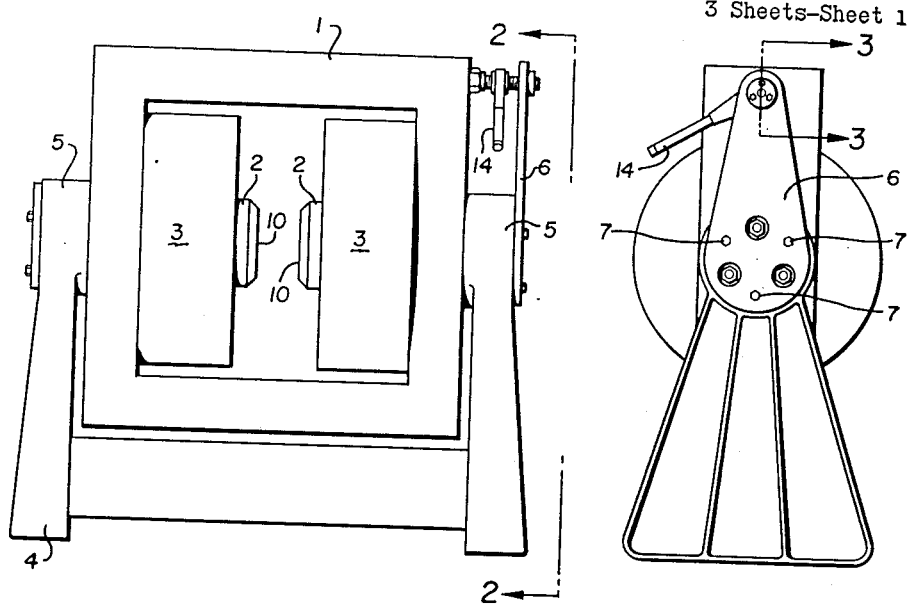
Fig. 1
Fig. 2
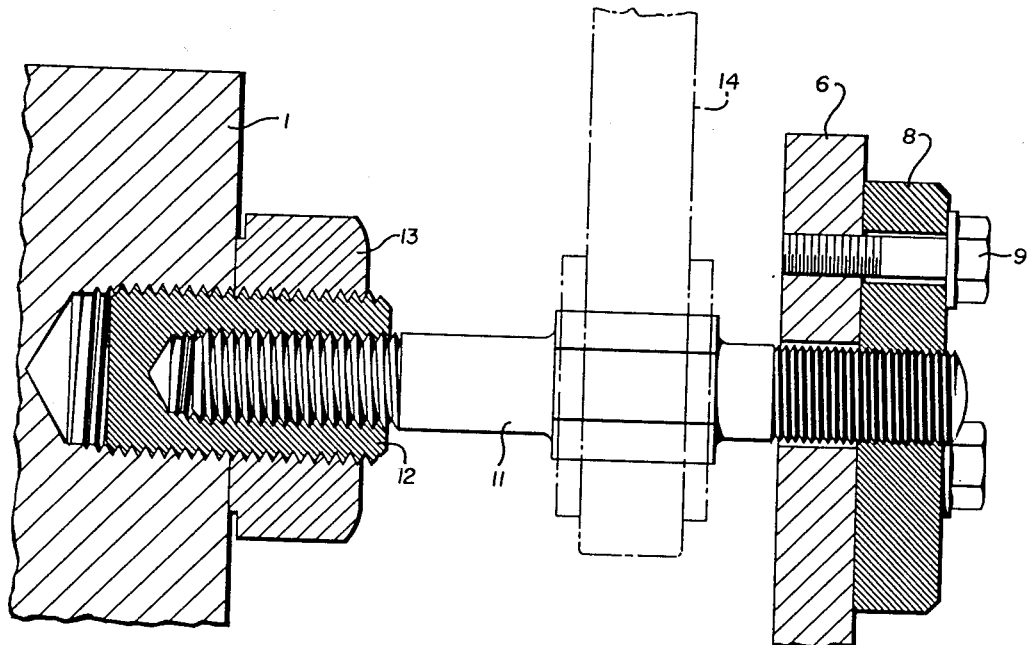
Fig. 3
INVENTOR.
Forrest A. Nelson
BY
Paul B. Hunter
Attorney Sept. 25, 1962  F. A. NELSON  3,056,070
MAGNET ADJUSTING METHOD AND APPARATUS
Filed Sept. 27, 1957  3 Sheets-Sheet 2
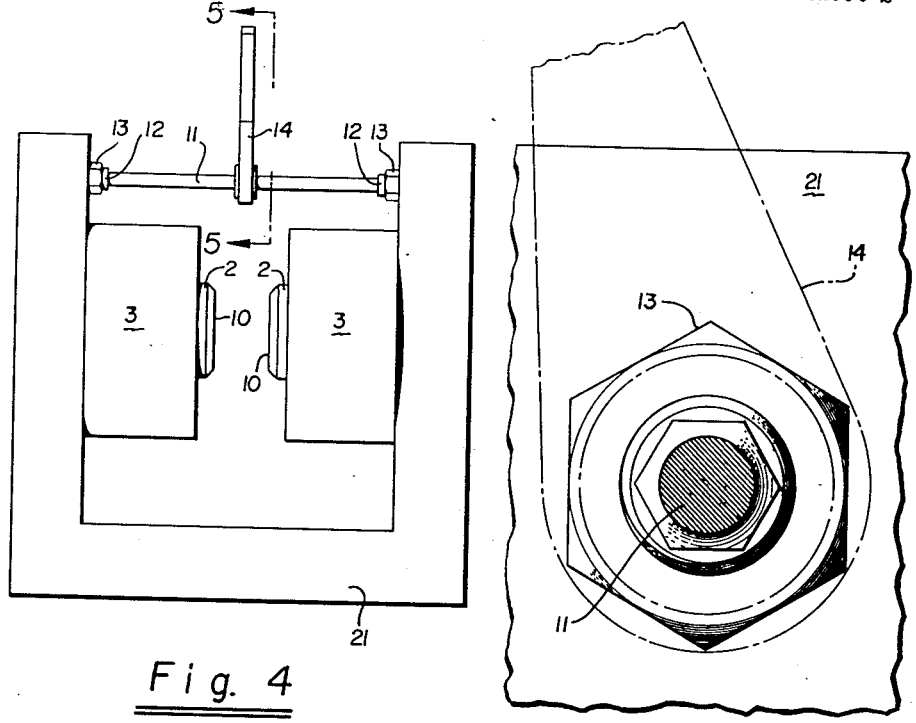
Fig. 4
Fig. 5
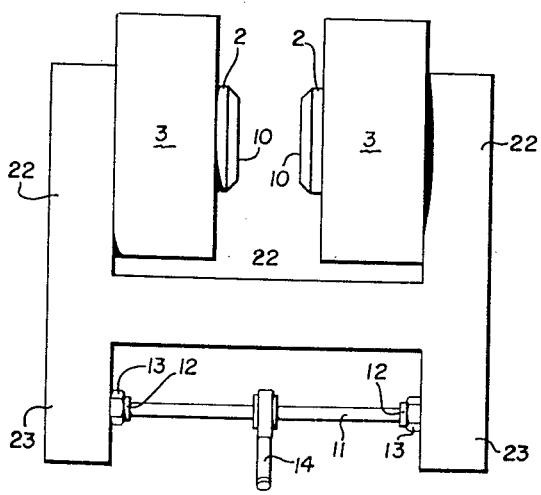
Fig. 6
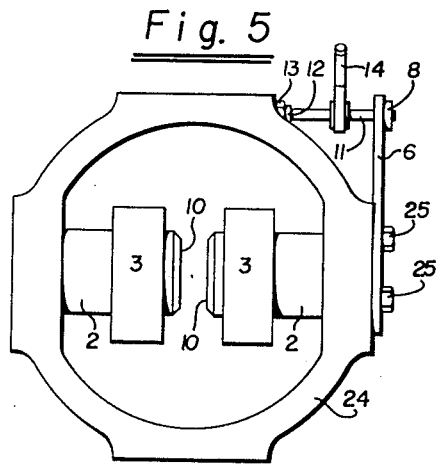
Fig. 7
INVENTOR.
Forrest A. Nelson
BY
Paul B. Hunter
Attorney Sept. 25, 1962    F. A. NELSON    3,056,070
MAGNET ADJUSTING METHOD AND APPARATUS
Filed Sept. 27, 1957    3 Sheets-Sheet 3

INVENTOR.
Forrest A. Nelson
BY
Attorney

United States Patent Office 3,056,070
Patented Sept. 25, 1962

3,056,070
MAGNET ADJUSTING METHOD AND
APPARATUS
Forrest A. Nelson, Palo Alto, Calif., assignor to Varian Associates, Palo Alto, Calif., a corporation of California
Filed Sept. 27, 1957, Ser. No. 686,681
11 Claims. (Cl. 317—158)

The present invention relates in general to magnets and more specifically to novel methods and apparatus for providing minute adjustments in the alignment of the pole faces of the magnet whereby the homogeneity of the magnetic field produced by the magnet may be greatly enhanced. Such magnets which produce an extremely homogeneous magnetic field are useful in gyromagnetic resonance spectroscopy applications where the resolution obtainable becomes a direct function of the homogeneity of the magnetic field employed.

Heretofore there has not been available a means for providing an extremely fine adjustment in the parallelism of the pole faces of magnets. It has been found that if a highly homogeneous magnetic field is required the opposing pole faces must be parallel to an extremely high degree. For example, in a magnet having pole faces with a 12 inch diameter and a three inch gap the parallelism must be maintained to within a few millionths of an inch for a magnetic field homogeneity to one part in 100 million. Such a high degree of homogeneity is often required in high resolution gyromagnetic resonance applications.

The present invention provides a novel method and apparatus for providing an extremely fine adjustment in the parallelism of magnet pole faces whereby the homogeneity of the magnetic field may be greatly enhanced. Briefly, the novel method and apparatus of the present invention includes the provision of means for applying to the magnet yoke or pole pieces a substantial bending moment whereby the yoke is slightly deformed, such deformation of the yoke being transformed into a slight angular displacement of the plane of the pole face of the magnet to produce an extremely slight change in the parallelism between the pole faces. Utilizing this novel method and apparatus is has been found that extremely fine adjustments in the parallelism of the pole faces and thus the homogeneity of the magnetic field may be readily accomplished with an extremely simple apparatus.

The principal object of the present invention is to provide a novel method and apparatus for effecting extremely small adjustments in the homogeneity of the magnetic field produced between the pole faces of magnets whereby the homogeneity of the magnetic field at the gap of the magnet may be greatly enhanced, as desired.

One feature of the present invention is the application of a variable bending moment to the magnet whereby the homogeneity of the magnetic field of the magnet may be varied, as desired.

Another feature of the present invention is the provision of means for applying to the yoke of the magnet a substantial bending moment such that the deformation produced by the moment is transferred through the yoke to produce an extremely slight adjustment in the homogeneity of the magnetic field whereby the homogeneity of the magnet may be greatly enhanced.

Another feature of the present invention is the provision of lever means fixedly secured to the yoke of the magnet and means for applying a bending moment to the yoke via said lever means for effecting an extremely slight adjustment of the homogeneity of the magnetic field of the magnet.

Another feature of the present invention is the provision of differential screw means for imparting forces to said lever means whereby an extremely simple and inexpensive adjustment of the homogeneity of the magnetic field produced by the magnet may be effected.

These and other features and advantages of the present invention will be more apparent after a perusal of the following specification taken in connection with the accompanying drawings, wherein FIG. 1 is a side elevational view of a magnetic assembly including the novel features of the present invention, FIG. 2 is a view of the structure of FIG. 1 taken along line 2—2 in the direction of the arrows, FIG. 3 is an enlarged cross-sectional view of a portion of the structure of FIG. 1 taken along line 3—3 in the direction of the arrows, FIG. 4 is a side elevational view of a magnet assembly including the novel features of the present invention, FIG. 5 is an enlarged cross-sectional view of a portion of the structure of FIG. 4 taken along line 5—5 in the direction of the arrows, FIG. 6 is a side elevational view of a magnet assembly including the novel features of the present invention, FIG. 7 is a side elevational view of a magnet assembly including the novel features of the present invention, FIG. 8 is a view similar to FIG. 2 showing a modified apparatus of the present invention, and FIG. 9 is a view similar to FIG. 1 showing a modified apparatus of the present invention.

Referring now to FIGS. 1 through 3 there is shown an embodiment of the present invention. More specifically, an electromagnet assembly includes a substantially rectangular yoke 1 of a highly permeable material such as, for example, iron which carries two magnetic poles 2 co-linearly disposed in spaced apart relationship. Mutually opposing surfaces of the pole pieces 2 form pole faces 10 and are ground flat and substantially parallel. Electric coil assemblies 3 are coaxially mounted on each of the mutually opposing poles 2 and are supplied with electrical current in such a fashion as to make one of the poles north and the other pole south.

The yoke assembly 1 is carried by a magnet stand 4 via two trunnion bearings 5 in axial alignment with the poles 2. A moment lever arm 6 is fixedly secured to the yoke assembly 1 via three hold down cap screws 7 extending through the moment lever arm 6 and into the trunnion extension of the yoke assembly 1. The moment lever arm extends upwardly in alignment with the magnet yoke assembly 1 and at its free end carries a circular moment lever plate 8 via three cap screws 9 extending through apertures suitably provided in the moment lever plate 8.

The moment lever plate 8 is centrally apertured and provided with internal threads for threadably mating with a first set of external threads on a differential adjusting screw 11. The other end of the differential adjusting screw 11 is provided with a second set of external threads having a substantially different pitch than the first set of threads. The second set of threads on the differential adjusting screw 11 mate with the internal threads of a stud 12 which is threaded into the magnet yoke 1 and fixedly held in position by a lock nut 13 threaded over the outside of the stud 12. The central portion of the differential adjusting screw 11 is provided with a hexagonal external configuration for mating with the hexagonal internal portion of a ratchet wrench 14 which is carried coaxially of the differential adjusting screw 11.

In operation angular adjustment of the differential adjusting screw 11 via ratchet wrench 14 will tend to urge the more flexible moment lever arm 6 to move either inwardly or outwardly of the yoke 1 resulting in a bending moment being applied to the yoke 1 via the intermediary of the moment lever arm 6. Depending upon whether the moment lever arm 6 is moved either inwardly toward the yoke assembly or outwardly of the yoke assembly 1 the bending moment applied to the yoke 1 may be of one sense or of the opposite sense. It has been found that such a bending moment is sufficient to produce a slight deformation in the yoke assembly 1 such that the parallelism between the pole faces 10 of the pole pieces 2 is slightly adjusted.

When the magnet is being utilized for high resolution gyromagnetic resonance spectroscopy the resolution of the resonance signal obtained from the sample of matter under investigation, disposed in the gap of the magnet, can be observed as adjustments are made on the differential adjusting screw 11. The differential adjusting screw 11 is then turned via ratchet 14 until the highest resolution is obtained. When the highest resolution is obtained it is then known that the faces are in an optimum state of parallelism in the direction parallel to the longitudinal axis of the moment lever arm 6.

If parallelism were desired to be obtained in a plane at right angles to the longitudinal axis of the moment lever arm 6 (see FIGS. 8 and 9) an extension 26 of the yoke assembly 1 is built outwardly thereof at right angles to the yoke 1 substantially at the intersection of the yoke 1 and the pole piece 2. A second differential adjusting screw assembly 27 including a second moment lever arm 28 is constructed at right angles to the first differential adjusting screw assembly for adjusting the parallelism of the pole faces.

Ordinarily for high resolution gyromagnetic resonance experiments extremely fine adjustments in the parallelism of the pole faces is required only in one plane as any slight inhomogeneities in the magnetic field produced by unparalleled pole faces in a plane at right angles to the first plane may be averaged out via spinning of the sample. The spinning sample method is taught in a copending application Serial No. 437,770 filed June 18, 1954, entitled "Line Narrowing Gyromagnetic Apparatus," invented by Felix Bloch, and now issued into U.S. Patent No. 2,960,649.

Referring now to FIGS. 4 and 5 there is shown another embodiment of the present invention. In this embodiment the differential screw mechanism, as previously described with regard to FIGS. 1 through 3, has been adapted for use in the C type magnet. More specifically, a C-shaped magnetic yoke assembly 21 carries two co-linearly disposed pole pieces 2 having substantially parallel polished pole faces 10. Electric coils 3 are suitably carried upon the pole pieces 2 coaxially thereof.

The free end portions of the C-shaped magnetic yoke assembly 21 are coupled together via a differential adjusting screw 11 carrying a ratchet wrench 14 coaxially thereof. The opposite ends of the differential adjusting screw 11 are provided with threads of different pitch for threadably mating with internally threaded studs 12 which are threaded into the free end portions of the magnet yoke 21 and locked into position via lock nuts 13.

In operation the parallelism of the pole faces 10 is adjusted, as desired, via rotation of the differential adjusting screw 11 through the intermediary of ratchet wrench 14. Rotation of the differential adjusting screw in one direction or the other will cause the free end portions of the magnet yoke 21 to be drawn together or pushed apart depending upon the sense of the rotation. The result is a small and fine adjustment of the parallelism between the mutually opposing pole faces 10.

Referring now to FIG. 6 there is shown another embodiment of the present invention. In this embodiment the C-shaped magnet yoke assembly 22 is provided with two substantially parallel extensions 23 thereto extending outwardly from the back side of the yoke to facilitate adjustment of the parallelism of the pole faces without interfering with access to the gap portion of the magnet. The differential adjusting screw assembly as described with regard to FIGS. 4 and 5 is provided for coupling together the two extensions 23 of the C-shaped magnet yoke 22.

In operation angular rotation of the differential adjusting screw 11 via the intermediary of the ratchet wrench 14 causes the magnet yoke extensions 23 to be either drawn together or pushed apart in variable accordance with the sense of the rotation of the differential adjusting screw 11. The deformation of the magnet yoke extensions 23 produced by differential adjusting screw 11 serves to apply a bending moment to the yoke 22 to produce a fine adjustment in the parallelism of the pole faces 10. This embodiment has the advantage of an unhampered access to the magnet gap.

Referring now to FIG. 7 there is shown another embodiment of the present invention. In this embodiment the apparatus is substantially identical to that of FIGS. 1 through 3 with the exception that the magnet yoke assembly more nearly approximates that of an octagon rather than a rectangle as shown in FIGS. 1 through 3. More specifically, an octagon-like shaped yoke assembly 24 carries the two magnet pole pieces 2 co-linearly in mutually opposing relation. The mutually opposing ends of the pole pieces 2 are provided with substantially flat and parallel pole faces 10. Electric coils 3 are carried coaxially of the pole pieces 2 to produce when energized a strong magnetic field in the gap between the pole pieces 2. A differential adjusting screw assembly substantially identical to that described with regard to FIGS. 1 through 3 is coupled to the octagon shaped magnet yoke 24. The moment lever arm 6 of the differential adjusting screw assembly is fixedly secured to the magnet yoke assembly 24 via a plurality of cap screws 25.

In operation the apparatus of FIG. 7 operates substantially identical to that of the apparatus of FIG. 1. Rotation of differential adjusting screw 11 via ratchet 14 imparts a force to moment lever arm 6 which applies a bending moment to the magnet yoke assembly 24. This bending moment is transferred through the yoke assembly 24 to effect a slight adjustment in the parallelism of the pole faces 10 in accordance with the angular adjustment of the differential adjusting screw 11.

By the phrase, an extremely or highly homogeneous magnetic field, is meant a magnetic field which is homogeneous to at least one part in $10^5$ per centimeter measured in a direction perpendicular to the direction of the magnetic field. By the phrase, high intensity magnetic field, is meant a magnetic field which is at least 5,000 gauss.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Magnet apparatus for providing a high intensity highly homogeneous magnetic field including, two magnet pole pieces disposed in substantial co-linear and mutually opposing relationship, a yoke assembly means of high magnetic permeability coupling said two magnet pole pieces together, said magnet pole pieces having substantially flat and parallel pole faces thereon in mutually opposing spaced apart relationship for producing therebetween the high intensity highly homogeneous magnetic field region, and means forming a moment arm coupled to said yoke assembly means whereby a variable force applied to said moment arm means serves to apply a variable bending moment to said yoke assembly for producing deformation therein to tilt one of said pole faces with respect to the other pole face to effectuate a change in the homogeneity of the magnetic field between the pole faces in variable accordance with the applied bending moment.

2. Magnet apparatus for providing a high intensity extremely homogeneous magnetic field including, two magnet pole pieces disposed in substantially co-linear and mutually opposing relationship, means forming a yoke assembly of high magnetic permeability coupling said two magnet pole pieces together, said magnet pole pieces having substantially flat and parallel pole faces thereon in mutually opposing spaced apart relationship, differential screw means for applying a variable bending moment to said magnet yoke assembly for producing deformation therein to tilt one of said pole faces with respect to the other pole face to effectuate a change in the homogeneity of the magnetic field between the pole faces in variable accordance with the applied bending moment.

3. The apparatus according to claim 2 wherein said differential screw means is coupled between spatially separated portions of said yoke assembly means.

4. The apparatus according to claim 3 including a moment arm means coupled to said yoke assembly substantially on the longitudinal axis of one of said pole pieces, and other portion of said moment arm means being coupled to said magnet yoke assembly via the intermediary of said differential screw means.

5. The apparatus according to claim 4 wherein said magnet yoke assembly comprises a substantially rectangular yoke.

6. The apparatus according to claim 4 wherein said yoke assembly comprises a substantially octagon-like shaped yoke assembly.

7. The apparatus according to claim 3 wherein said yoke assembly comprises a substantially C-shaped yoke, and said differential screw means is coupled between the free end portions of said C-shaped yoke assembly.

8. The apparatus according to claim 3 wherein said yoke assembly comprises a substantially C-shaped yoke, and said differential screw means is coupled between yoke extensions extending outwardly from the back side of the C-shaped yoke.

9. The method of adjusting the homogeneity of a high intensity highly homogeneous magnetic field produced between the pole faces of a magnet having a yoke comprising the steps of, applying a variable bending moment to the magnet yoke to produce deformation of the yoke to tilt one of the pole faces with respect to the other pole face, and varying the magnitude of the applied bending moment to achieve a desired degree of homogeneity of the magnetic field.

10. The apparatus according to claim 1 wherein said yoke assembly means includes a fixedly closed solid magnetic member having a pair of re-entrant mutually opposed portions terminating in said two magnetic pole pieces, and said moment arm having a cross sectional area substantially less than the cross sectional area of said yoke member whereby yoke deforming forces as applied to said yoke through the intermediary of said moment arm produce substantially greater deformation of said moment arm than said yoke thereby allowing sensitive adjustments in the homogeneity of the magnetic field.

11. The apparatus according to claim 10 including a differential screw means for applying said yoke deforming forces to said yoke through the intermediary of said moment arm.

References Cited in the file of this patent
UNITED STATES PATENTS

| | | |
|---|---|---|
| 349,611 | Stanley | Sept. 21, 1886 |
| 2,394,070 | Kerst | Feb. 5, 1946 |
| 2,534,557 | Ostreicher | Dec. 19, 1950 |
| 2,617,092 | Schlawin | Nov. 4, 1952 |
| 2,695,978 | Scag | Nov. 30, 1954 |
| 2,819,431 | Maxwell | Jan. 7, 1958 |